United States Patent [19]
Lawford et al.

[11] 3,956,937
[45] May 18, 1976

[54] PRESSURE SENSING SYSTEM

[75] Inventors: Victor Nicholas Lawford, Pasadena; Charles Edwin Long, Whittier, both of Calif.

[73] Assignee: International Telephone and Telegraph Corporation, New York, N.Y.

[22] Filed: Nov. 21, 1974

[21] Appl. No.: 525,888

[52] U.S. Cl. .............................. 73/395; 73/410; 73/205 R
[51] Int. Cl.² .......................................... G01L 7/06
[58] Field of Search ............... 73/407 R, 395, 410, 73/406, 420, 205 R, 211, 212, 213, 4 R, 430

[56] References Cited
UNITED STATES PATENTS

| | | | |
|---|---|---|---|
| 2,365,573 | 12/1944 | McGay | 73/205 |
| 3,047,022 | 7/1962 | Aldinger | 73/407 R |
| 3,301,064 | 1/1967 | Kisling | 73/406 |
| 3,400,588 | 9/1968 | O'Connor | 73/407 |
| 3,696,659 | 10/1972 | Lawford | 73/4 R |

FOREIGN PATENTS OR APPLICATIONS

| | | | |
|---|---|---|---|
| 460,165 | 1/1937 | United Kingdom | 73/407 R |

Primary Examiner—Herbert Goldstein
Assistant Examiner—Anthony V. Ciarlante
Attorney, Agent, or Firm—A. Donald Stolzy

[57] ABSTRACT

A system for use in connection with a flowmeter (volume flow rate), liquid level detector for a storage tank, a pressure indicator or otherwise. A pair of bellows assemblies connects a pressure source to a pressure sensitive instrument via conduit means including a detachable coupling. One bellows can be permanently (welded) attached to the pressure source. The instrument may be removed for service by uncoupling. The conduit means can carry two liquids separated by a bellows. One liquid may be NaK (a sodium and potassium mixture) which is used for radioactive applications and to detect the liquid level of a 1000°F. liquid sodium storage tank or the pressure or liquid level of a corrosive liquid. The other liquid can be an oil that transmits the NaK pressures to the pressure sensitive instrument. The detachable coupling is a double-seal type (both halves automatically close), and is placed in the oil-filled conduit. The oil-filled conduit is not subjected to high temperatures.

4 Claims, 5 Drawing Figures

PRESSURE SENSING SYSTEM

BACKGROUND OF THE INVENTION

This invention relates to pressure transmission systems, and more particularly to a system for transmitting pressure from a hot, radioactive, corrosive or other liquid or a bellows-like or other assembly fixed relative to a pressure source.

Prior art hereto is disclosed in U.S. Pat. Nos. 3,262,463, 3,696,659; and in copending application Ser. No. 377,200 filed July 9, 1973, by V. N. Lawford et al. for FLOWMETER AND FUNCTION GENERATOR THEREFOR. Said copending application Ser. No. 377,200 is assigned to the assignee of this application.

In the prior art it was impossible to decouple a pressure sensitive instrument from a hazardous pressure source because a radioactive, hot, corrosive or other type of liquid would spill. Moreover, decoupling at the source of such a liquid is often impossible because the fitting thereto is welded.

SUMMARY OF THE INVENTION

In accordance with the system of the present invention, the abovedescribed and other disadvantages of the prior art are overcome.

In accordance with the present invention the system thereof may be used in connection with a flowmeter (volume flow rate), liquid level detector for a storage tank, a pressure indicator or otherwise. A pair of bellows assemblies connects a pressure source to a pressure sensitive instrument via conduit means including a detachable coupling. One bellows can be permanently (welded) attached to the pressure source. The instrument may be removed for service by uncoupling. The conduit means can carry two liquids separated by a bellows. One liquid may be NaK (sodium and potassium mixture) which is used for radioactive applications and to detect the liquid level of a 1000°F. liquid sodium storage tank of the pressure or liquid level of a corrosive liquid. The other liquid can be an oil that transmits the NaK pressures to the pressure sensitive instrument. The detachable coupling is a double-seal type (both halves automatically close), and is placed in the oil-filled conduit. The oil-filled conduit is not subjected to high temperatures.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
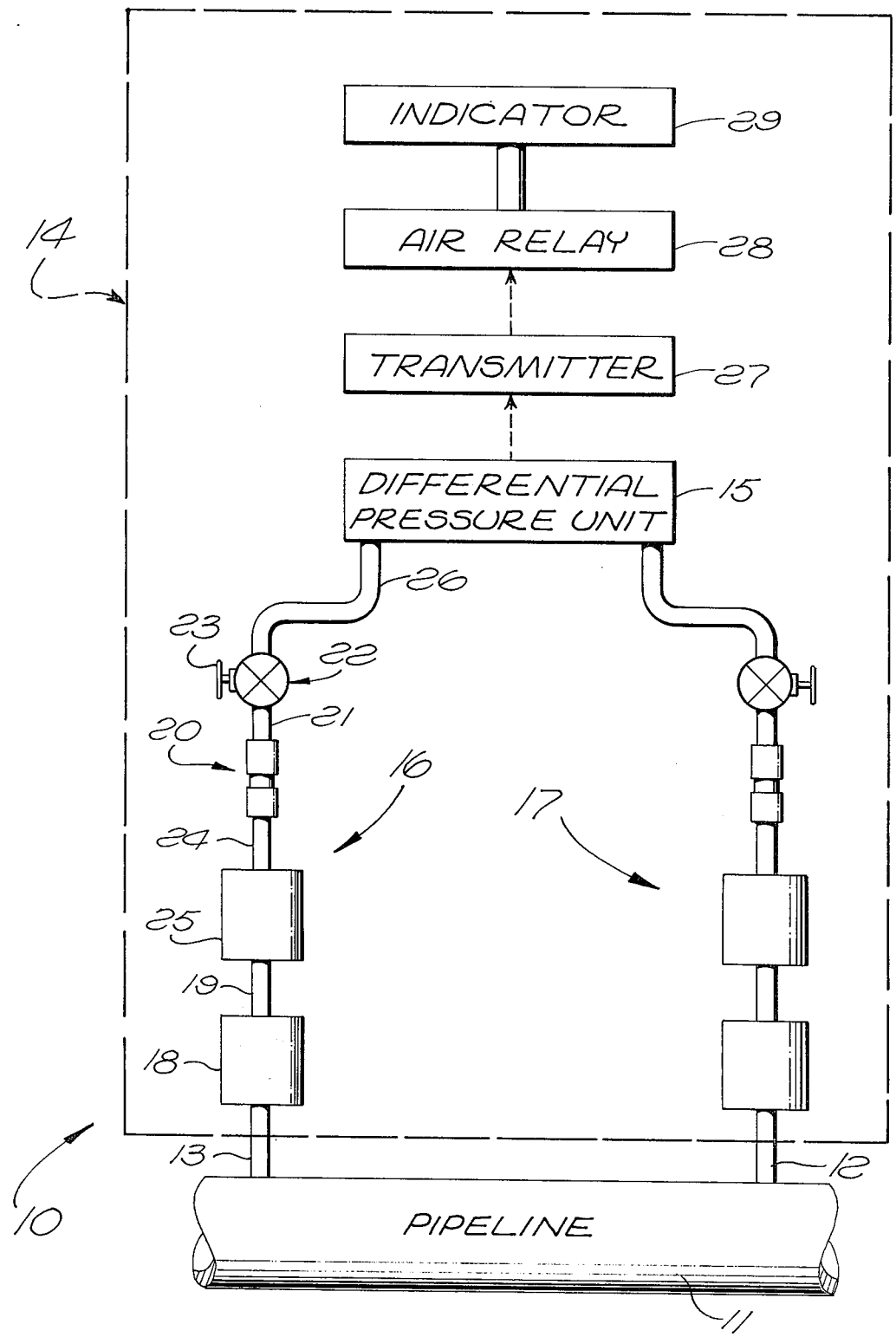
FIG. 1 is a block diagram of a system constructed in accordance with the present invention.

The embodiment of the present invention illustrated in FIG. 1 is a flowmeter. This flowmeter is indicated at 10. The flowmeter includes a pipeline 11 connected via sections of tubing 12 and 13 to a detector assembly 14. A differential pressure unit 15 is provided in assembly 14. Pipeline 11 is connected to differential pressure unit 15 via two conduit means 16 and 17, both of which may or may not be identical. However, since both means 16 and 17 may be identical, only means 16 will be described in detail.

Pipeline 11 is connected to a bellows assembly 18 via a tubing section 13. A tubing section 19 connects assembly 18 to another bellows assembly 25. A tubing section 24 connects bellows assembly 25 to a coupling 20. A tubing section 21 connects coupling 20 to a valve 22. Valve 22 may or may not be a needle valve, as desired. Valve 22 may be adjustable via a knob 23. A tubing section 26 connects valve 22 to differential pressure unit 15. Valve 22 is employed to, if desired, damp surges in oil which fills the entire conduit means 16 and 17.

Pipeline 11 may, for example, be filled with NaK (mixture of liquid sodium and liquid potassium employed in nuclear power stations).

The output of differential pressure unit 15 is impressed upon a transmitter 27 which may be identical, if desired, to any of the transmitters disclosed in the said U.S. Pat. No. 3,262,463 or in the said copending application.

The output of transmitter 27 is impressed upon an air relay 28. This air relay may be identical to the air relay disclosed in U.S. Pat. No. 3,262,463 or in the said copending application. By this reference hereto, the said U.S. Pat. No. 3,262,463 and the said copending application are hereby incorporated herein as though set forth in their entirety hereat.

The output of air relay 28 is connected to an indicator 29. Indicator 29 may be, if desired, a pressure indicator calibrated in volume rate of flow.

Figure 2:
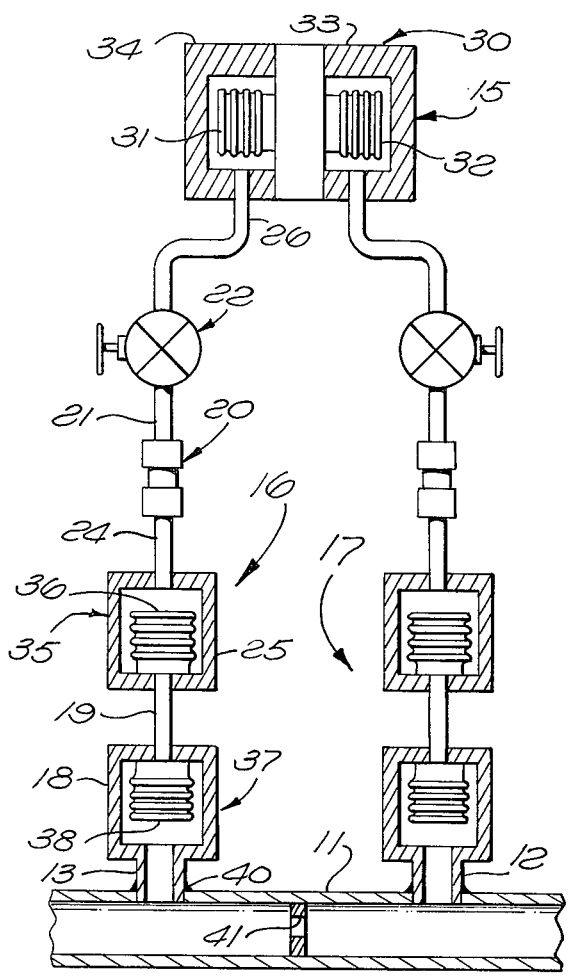
FIG. 2 is a vertical sectional view, partly in an elevation, of the system shown in FIG. 1.

As shown in FIG. 2, differential pressure unit 15 is provided with a housing 30 having bellows 31 and 32 therein.

Housing 30 has a portion 33 surrounding bellows 32, and a portion 34 surrounding bellows 31.

The interior of housing portion 34 is connected to valve 22. Tubing section 26 provides free and open communication from the interior of housing portion 34 to valve 22.

Bellows assembly 25 also has a bellows 36 which is sealed to the interior wall of housing 35. Tubing section 19 is sealed through the wall of housing 35 and provides free and open communication between the interior of bellows 36 and the interior of a bellows 38 in bellows assembly 18.

Bellows assembly 18 may be substantially identical to bellows assembly 25 except that bellows assembly 18 is inverted. For example, bellows assembly 18 has a housing 37 and the bellows 38 which is sealed to the upper wall thereof instead of to the lower wall thereof. The interiors of bellows 36 and 38 are thus in communication with each other. The upper end of bellows 38 is sealed around the port through which tubing section 19 projects through housing 37. Tubing section 19 is sealed through the port in housing 37.

Housing 37 has tubing section 13 which extends through the wall of pipeline 11 and is welded therethrough at 40. An orifice 41 is provided inside pipeline 11 between conduit means 16 and 17.

Figure 3:
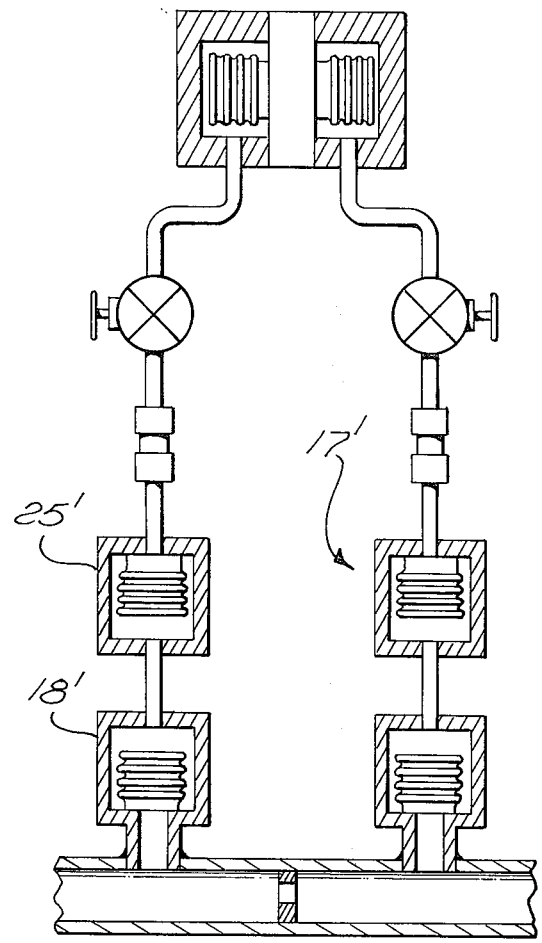
FIG. 3 is a schematic diagram of a portion of a system of the present invention similar to that illustrated in FIG. 2.

FIG. 3 is identical to FIG. 2 except that, in FIG. 3, bellows assemblies 25' and 18' are inverted relative to bellows assemblies 25 and 18, respectively. The same is true of the corresponding bellows assemblies in conduit means 17'. Any combination may be employed.

Figure 4:
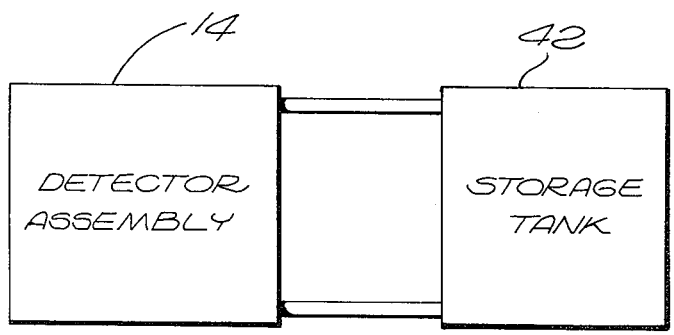
FIG. 4 is a block diagram of an alternative embodiment of the present invention.

As shown in FIG. 4, detector assembly 14 may be employed with a storage tank 42 to determine the liquid level in the latter.

Figure 5:
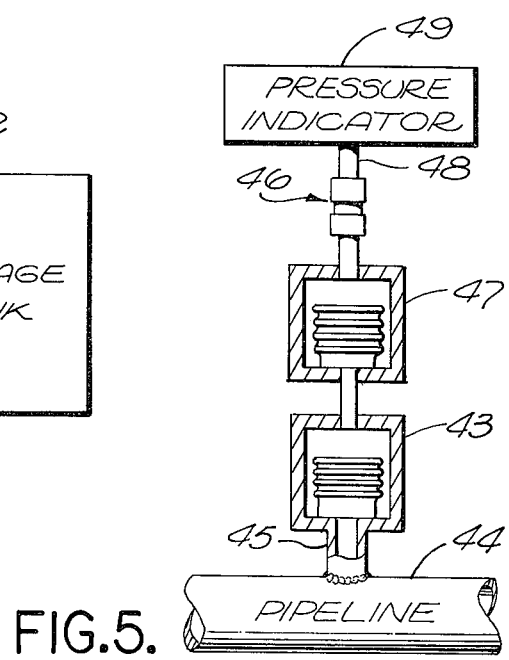
FIG. 5 is a diagrammatic view of still another embodiment of the present invention.

In accordance with the present invention, the system thereof may be, in FIG. 5, employed simply as a pressure indicator. For example, a bellows assembly 43 may be connected from a pipeline 44 by a tubing section 45. A bellows assembly 47 is connected from bellows assembly 43. A coupling 46 is connected from bellows assembly 47 to a tubing section 48 which, in turn, is connected to a pressure indicator 49.

From the foregoing, it will be appreciated that capsules, diaphragms and other devices may be employed in lieu of the bellows disclosed herein.

From FIG. 1, it will be appreciated that the system of the present invention may be employed in a flowmeter. In FIG. 4, the system of the present invention may be employed as a liquid level detector.

From FIG. 5, it will be appreciated that the system of the present invention may be employed as a pressure indicator.

SUMMARY

The present invention may be employed to detect differential or static pressure. One capillary or two may be employed. The invention is especially adapted for use in hostile environments. However, it may have many other uses. As an example only, pipeline 11 shown in FIG. 1 may carry NaK which may be radioactive.

Tubing sections 12 and 13 may be welded to pipeline 11. However, it is yet possible to remove most of the detector assembly 14 by uncoupling at 20 and the corresponding part of conduit means 17.

Should the fluid flowing in pipeline 11 in FIG. 1 be unusually hot, e.g. 1000°F., uncoupling for repair of the detector assembly 14 is still made possible.

To demonstrate the use of detector assembly 14 in FIG. 4, storage tank 42 may be, if desired, a tank of liquid sodium maintained at a temperature of 1000°F.

As stated previously, indicator 29 may, if desired, indicate rate of flow in pipeline 11 in units of volume per unit time.

The fluid flowing in pipeline 11 shown in FIG. 1 may also be corrosive. In such a case, detector assembly 14 may still be effectively uncoupled from pipeline 11 via coupling 20 and the corresponding coupling in conduit means 17.

In accordance with the foregoing, an outstanding feature of the present invention resides in the use of tubing section 13 and the corresponding tubing section in means 17 in FIG. 1 filled, for example, with radioactive NaK, the same or another hot fluid, or a corrosive fluid or the like. On the other hand, tubing section 24 and its corresponding tubing section in means 17 and thereabove may be filled with oil. This thus allows decoupling at 20 etc. without hazard. The tubing section 13 etc. is then permanently installed, but the oil tubing section 21 etc. can be "opened" at coupling 20 etc. to remove the instrument, i.e., detector assembly 14. The coupling 20 etc. may be entirely conventional, if desired, and seal both facing ends of tubing sections 21 and 24 etc. when coupling 20 is opened.

What is claimed is:

1. A pressure sensing system, said system comprising: a first bellows assembly adapted for connection from a source of fluid under pressure; a second bellows assembly connected from said first bellows assembly; and conduit means including a detachable coupling connecting said second bellows assembly to a pressure sensitive instrument, said first and second assemblies being difficult or impossible to disconnect from said source whereby said first assembly isolates fluid from said source from said second assembly and a fluid sealed space is formed between said first and second assemblies.

2. The invention as defined in claim 1, wherein said first and second assemblies include respective first and second hollow housings having first and second ports, said first assembly first port being adapted for a sealed connection with a port through said source, said conduit means having one end sealed through said second assembly first port and its other end connected to said instrument; first and second bellows each having a closed end, and an open end sealed around said first and second assembly second ports, respectively, said second assembly having a construction substantially the same as that of said first assembly, the interiors of said first and second bellows being in communication with each other.

3. The invention as defined in claim 2, wherein said conduit means includes an adjustable valve.

4. The invention as defined in claim 3, wherein said valve is a needle valve.

* * * * *